United States Patent [19]

Ward, III

[11] Patent Number: 5,649,430

[45] Date of Patent: Jul. 22, 1997

US005649430A

[54] INSULATING FOAM OF LOW THERMAL CONDUCTIVITY AND METHOD OF PREPARATION

[75] Inventor: William Jessup Ward, III, Schenectady, N.Y.

[73] Assignee: General Electric Company, Schenectady, N.Y.

[21] Appl. No.: 673,414

[22] Filed: Jun. 28, 1996

Related U.S. Application Data

[62] Division of Ser. No. 491,826, Jun. 19, 1995.

[51] Int. Cl.$^6$ .............. C08G 18/00; C08J 9/00
[52] U.S. Cl. .............. 62/259.1; 252/181.3; 252/181.4; 252/181.5; 252/181.7; 521/92; 521/97; 521/98; 521/130; 521/131; 521/155
[58] Field of Search ............... 62/259.1, DIG. 3; 252/181.3, 181.4, 181.5, 181.7; 521/92, 97, 98, 130, 131, 155

[56] References Cited

U.S. PATENT DOCUMENTS

| | | | |
|---|---|---|---|
| 5,371,113 | 12/1994 | Ward, III et al. | 521/123 |
| 5,389,695 | 2/1995 | Jaster et al. | 521/97 |
| 5,567,739 | 10/1996 | Ward, III et al. | 521/123 |

*Primary Examiner*—Morton Foelak
*Attorney, Agent, or Firm*—William H. Pittman

[57] ABSTRACT

Insulating foam for refrigerators and the like is prepared by blowing in the presence of carbon dioxide as the sole or principal blowing agent. The thermal conductivity of the foam is decreased by sealing said foam in a gas-impervious enclosure with at least one getter, such as an alkaline material, capable of removing carbon dioxide and at least one drying agent which will produce a relative humidity greater than the equilibrium relative humidity over a saturated aqueous solution of the getter, thus removing water without rendering the getter anhydrous. For example, calcium chloride dihydrate may be used when the getter is sodium hydroxide.

11 Claims, No Drawings

INSULATING FOAM OF LOW THERMAL CONDUCTIVITY AND METHOD OF PREPARATION

This application is a division of Ser. No. 08/491,826 filed Jun. 19, 1995.

BACKGROUND OF THE INVENTION

This invention relates to insulating foams, and more particularly to foams having unusually low thermal conductivity.

Insulating foam, particularly polyurethane foam, is an indispensable constituent of many refrigerators and similar cooling units. By reason of increasingly strict Federal Government energy conservation standards, it is of interest to develop foams having substantially lower thermal conductivity than those presently available.

Conventional insulating polyurethane foam is generally prepared by the reaction of at least one polyol with at least one diisocyanate in the presence of suitable catalysts, surfactants and blowing agents. Among the blowing agents employed are halogenated compounds, which may be halocarbons such as monofluorotrichloromethane and/or halohydrocarbons such as 1,1-dichloro-1-fluoroethane. They remain in the cell voids of the foam after blowing, and their presence therein is beneficial since they have low thermal conductivity and thus contribute to the insulating quality of the foam.

Also usually present in the reaction mixture is water, which serves at least three purposes. First, in small quantities it is effective to improve the flow properties of the mixture. Second, it reacts with a minor proportion of the diisocyanate to form carbon dioxide, which is also effective as a blowing agent. Third, it reacts to form substituted urea crosslinking moieties, thus stabilizing the foam as it is produced.

The use of many halocarbons and halohydrocarbons is now severely restricted or, in some cases, prohibited by reason of their properties of depleting the stratospheric ozone layer and promoting greenhouse global warming. It is therefore necessary to develop methods for blowing insulating foam which do not require the use of halogen-containing blowing agents. At the same time, however, a high degree of insulating power is more necessary than ever to decrease energy consumption. An additional desirable factor is suppression of the "greenhouse effect" which promotes global warming.

Carbon dioxide has a high thermal conductivity, on the order of 17 milliwatts/m-°K. Thus, a foam prepared with the use of a blowing agent combination including 15% and 50% (by volume) carbon dioxide with the balance being monofluorotrichloromethane has a thermal conductivity approximately 5% and 15%, respectively, higher than a corresponding foam prepared without the use of carbon dioxide.

In U.S. Pat. No. 5,371,113, there is described a method for preparing polyurethane foam of low thermal conductivity by incorporating in the foam, at the time of its preparation, a solid reagent or "getter" which is incorporated in said foam and which is capable of removing said carbon dioxide. Alkaline materials are particularly useful for this purpose, with sodium hydroxide often being preferred. U.S. Pat. No. 5,389,695 describes a similar method in which the foam is seated in a gas-impervious enclosure in the presence of an inert gas of low thermal conductivity, such as krypton or xenon, at a partial pressure in the range of about 20–200 torr. The disclosures of both of said patents are incorporated by reference herein.

The reaction of sodium hydroxide with carbon dioxide produces sodium carbonate and water, each being formed in an equimolar amount with respect to the carbon dioxide which has reacted. Water, however, also has high thermal conductivity. In the vapor state, its conductivity is essentially the same as that of carbon dioxide. In addition, any liquid water present is an efficient conductor of heat.

It might be thought that the inclusion of a drying agent in the system could result in removal of whatever water is formed, further reducing the thermal conductivity of the system. However, the reaction of getters such as anhydrous sodium hydroxide with carbon dioxide in the presence of most drying agents is so slow as to be commercially unpracticable. The presence of minor amounts of water in the system is necessary for the reaction to proceed at a suitable rate.

SUMMARY OF THE INVENTION

The present invention is based on the discovery of a class of drying agents which can be employed to remove water from the system including the insulating foam without detrimentally reducing the rate of the reaction of the getter with the carbon dioxide.

In one of its aspects, the invention is a method for preparing an insulating foam of low thermal conductivity which comprises:

blowing a formable resinous foam with a gaseous mixture comprising carbon dioxide, and sealing said foam in a gas-impervious enclosure with (A) at least one gas having a thermal conductivity less than that of carbon dioxide, (B) at least one solid alkaline getter capable of carbon dioxide removal and (C) at least one drying agent effective to produce, at a temperature in the range of 20°–25° C. and in the presence of water vapor, a relative humidity greater than the equilibrium relative humidity over a saturated aqueous solution of said getter at that temperature and less than about 20%.

Another aspect is an insulating article comprising:

a gas-impervious enclosure;

an insulating foam in said enclosure;

at least one gas in said enclosure having a thermal conductivity less than that of carbon dioxide;

a first composition in said enclosure, comprising at least one of a solid alkaline getter for carbon dioxide and a reaction product of said getter with carbon dioxide; and a second composition in said enclosure, comprising at least one of a drying agent as described hereinabove and a reaction product of said drying agent with water.

Still another aspect is a refrigeration apparatus (e.g., a refrigerator or freezer) insulated by an article as defined hereinabove.

DETAILED DESCRIPTION; PREFERRED EMBODIMENTS

Any resinous material capable of being converted to a stable foam may be employed in the invention. Illustrative resinous materials are thermoplastics such as polyphenylene ether, polystyrene and combinations thereof, and thermoset resins such as polyurethanes. Polyurethanes are generally preferred by reason of their relatively low cost, high dimensional stability and general suitability. Because of these advantages, reference will frequently be made hereinafter to polyurethane foam. However, it should be understood that other foamed resinous materials, both thermoplastic and thermosetting, may be substituted for polyurethane when appropriate and may be produced for use in the invention by methods which will be apparent to those skilled in the art.

The polyurethane-forming reagents which may be employed according to the present invention are conventional and well known in the art, and therefore do not require extended discussion herein. In general, said reagents include at least one polyol, typically a poly(oxyalkylene) polyol, and at least one diisocyanate such as toluene diisocyanate, employed in proportions effective to produce the desired polyurethane as a reaction product. Also typically present are catalysts such as amines and organotin compounds, as illustrated by dimethylcyclohexylamine and dibutyltin dilaurate; and surfactants, typically silicone compounds.

An essential feature of the invention is the employment of carbon dioxide as the principal blowing agent. In the case of polyurethane foams, carbon dioxide is typically produced in situ by the reaction of diisocyanate with added water. If the amount of water is insufficient to produce the required amount of carbon dioxide, additional carbon dioxide may be added in gaseous form.

In the case of a polyurethane foam, the required carbon dioxide is entirely or partially supplied by the reaction of water with the diisocyanate employed as a resin-forming reagent. In the case of other resins, or if more carbon dioxide is needed, it may be externally provided.

While the use of a blowing agent consisting of carbon dioxide is frequently preferred, it is within the scope of the invention to employ other blowing agents in combination therewith. Materials suitable for this purpose include saturated hydrocarbons of low to medium volatility such as cyclopentane, halocarbons such as monofluorotrichloromethane and halohydrocarbons such as 1,1-dichloro-1-fluoroethane. The invention is particularly useful in situations where carbon dioxide is the sole or predominant blowing agent, since the proportion of water vapor present can then have a significant effect on the thermal conductivity of the foam if water removal methods are not employed.

Following the foaming operation, the foam is hermetically sealed in a suitable enclosure which will substantially exclude air, prevent loss of inert gas and serve as a barrier to passage of water vapor. If the foam is to be employed to insulate a refrigerator, freezer or the like, the enclosure may be of welded metal. More often, however, it is of a polymeric barrier material.

Suitable barrier materials are known in the art and include, for example, polyvinyl alcohol and ethylene-vinyl alcohol copolymers. In general, a multilayer polymeric material is preferred in which another layer comprises a structurally stable polymer such as a polyester. If a high proportion of water vapor is anticipated in the environment of the insulation (e.g., a relative humidity equal to or greater than about 50%), a water-resistant layer such as poly(vinylidene fluoride) may be incorporated. In order to facilitate sealing of the enclosure, a heat-sealable layer, typically of an olefin polymer such as polyethylene, may also be present. A suitable multilayer barrier polymeric material is sold by Fres-Co System U.S.A., Inc., under the trade name VECAT.

One component present in said enclosure is at least one gas having a thermal conductivity lower than that of carbon dioxide. Suitable gases for this purpose include the previously mentioned hydrocarbons, halocarbons and halohydrocarbons employable as blowing agents. Also suitable are krypton and xenon at low partial pressures, as disclosed in the aforementioned U.S. Pat. No. 5,389,695.

An essential feature of the invention is the incorporation of at least one solid alkaline carbon dioxide getter in the foam during blowing or upon sealing the foam in the enclosure. It is preferably added as a finely divided powder, although larger particles such as granules (maximum particle size up to about 2 mm.) may also be effective.

Over a period of time, the getter removes the carbon dioxide in the cell voids of the foam. Typical times required for removal are on the order of 1–2 months.

Suitable getters include alkali metal and alkaline earth metal oxides and hydroxides, as exemplified by lithium hydroxide, sodium hydroxide, calcium oxide and hydroxide and barium oxide and hydroxide. Mixtures of these reagents may also be employed. An example is soda lime which is a mixture of calcium oxide with about 5–20% sodium hydroxide, said mixture generally also containing about 6–18% water. Sodium hydroxide is especially preferred.

Also incorporated in the foam, during foaming or upon sealing it in the enclosure, is at least one drying agent effective to produce, at a temperature in the range of 20°–25° C. (hereinafter sometimes "critical temperature range") and in the presence of water vapor, a relative humidity greater than the equilibrium relative humidity over a saturated aqueous solution of said getter at that temperature. The maximum relative humidity value produced should be low enough so that the combined remaining water vapor and liquid water do not undesirably raise the thermal conductivity of the foam. Said maximum should be less than about 20% and is preferably less than about 15%.

As previously mentioned, at least trace amounts of water must be present in order for carbon dioxide removal to proceed at a practical rate. Taking as illustrative the use of sodium hydroxide as a getter, the water formed in the reaction thereof with carbon dioxide dissolves the solid sodium hydroxide to form a saturated solution. As shown in Melior, *A Comprehensive Treatise on Inorganic and Theoretical Chemistry*, Volume 2, p. 502 (1922), the solubility of sodium hydroxide in water is 52.2 g/100 ml at 20° C. and 54.3 g/100 ml at 30° C. As further shown in Volume 2, Supplement II (1961) thereof, at page 682, the vapor pressure of water at 30° C. over a solution of 48 g of sodium hydroxide in 100 g of water is 3.60 torr, which is equivalent to about 14.5% relative humidity. At saturation, therefore, the relative humidity will be lower than 14.5%. The vapor pressure and corresponding relative humidity will, of course, also be somewhat lower at temperatures in the critical temperature range.

The phase diagram of calcium chloride, a widely used drying agent, is shown at Kirk-Othmer, *Encyclopedia of Chemical Technology*, Fourth Edition, Volume 7, p. 1035. An examination of that phase diagram shows that the relative humidity of an atmosphere over anhydrous calcium chloride within the critical temperature range is on the order of 1.5%, while the monohydrate produces a relative humidity on the order of 5–6%. These values are, of course, much too low for effective use in this invention of calcium chloride in the anhydrous state or as the monohydrate.

Over calcium chloride dihydrate, on the other hand, the vapor pressures at 20° and 40° C., respectively, are 14% and 16.2%. At 25° C., therefore, the humidity is about 14.5%, which is greater than the equilibrium relative humidity over saturated aqueous sodium hydroxide at the same temperature. Thus, calcium chloride dihydrate is one example of a drying agent for use according to this invention. By reason of its particular suitability and relatively low cost, it is generally preferred.

In a typical foam-producing operation according to the invention, diisocyanate is one reactive stream while polyol, catalysts, surfactants and water form the other. Getter and drying agent may be introduced at the time of foam production, typically in combination with the polyol stream or, preferably, as a third stream in the form of a viscous slurry in a suitable non-reactive liquid such as a relatively high molecular weight amine, a polyepoxide or a polyoxyalkylenediamine. The use of the latter two classes of compounds for this purpose is disclosed in copending, commonly owned application Ser. No. 08/268,082, the disclosure of which is incorporated by reference herein. The streams may be mixed in a conventional foam-producing nozzle or mixing head.

The amounts of getter and drying agent employed are amounts effective to remove a substantial proportion of the carbon dioxide and water, respectively, in the foam within the aforementioned period of about 1–2 months after foaming. The amount adequate for this purpose will vary according to the reagents employed, their particle size and other conditions, but can easily be determined by simple experimentation. Typically, the molar ratios of getter to theoretical carbon dioxide and of drying agent to theoretical water formed should be in the range of about 1–3:1 and preferably about 1.1–2.0:1. The proportions of getter and drying agent in the combination thereof with the carrier liquid are generally each in the range of about 20–80%, with about 40–70% being preferred.

In the insulating articles of this invention as defined hereinabove, the natures of the first and second compositions are governed by the fact that with the passage of time, the getter will absorb carbon dioxide and the drying agent will absorb water. Therefore, said getter and drying agent are converted to their respective reaction products with carbon dioxide and water.

The refrigeration apparatus of this invention is conventional other than the employment therein of the novel insulating articles of the invention. Thus, they may be refrigerators or freezers of conventional design except for the necessity for maintaining a gas-impervious enclosure for the insulating foam. Methods of maintaining such enclosures will be apparent to those skilled in the art.

The invention is illustrated by an example in which a masterbatch was prepared from 92.5 parts (all parts being by weight) of a commercially available poly(oxyalkylene) polyol, 0.95 part of a first foaming catalyst, 0.55 part of a second foaming catalyst, 2 parts of a silicone surfactant and 4 parts of water. The masterbatch was mixed with 10.7 parts of anhydrous sodium hydroxide and 9.8 parts of calcium chloride dihydrate, and the resulting mixture was blended with 155.4 parts of a commercially available diisocyanate to form a foaming blend. Said blend was poured into an aluminum mold maintained at 50° C., forming a polyurethane foam having a density of about 33.7 kg/m$^3$. The foam was packed 10% and packaged in an impermeable barrier film.

At intervals, gas samples were withdrawn from the film with a syringe and analyzed by gas chromatography. After less than two months, analysis of the foam produced according to the invention showed the presence of no or only trace amounts of carbon dioxide. By contrast, a control foam prepared in the same way with the use of anhydrous calcium chloride showed the presence of carbon dioxide in substantial quantities, consistent with essentially no reaction with sodium hydroxide having taken place.

What is claimed is:

1. An insulating article comprising:

a gas-impervious enclosure;

an insulating formable resinous foam in said enclosure;

at least one gas in said enclosure having a thermal conductivity less than that of carbon dioxide;

a first composition in said enclosure, comprising at least one of a solid alkaline getter for carbon dioxide and reaction product of said getter with carbon dioxide; and a second composition in said enclosure, comprising at least one of dying agent as described hereinabove and a reaction product of said dying agent with water.

2. An article according to claim 1 wherein the foam is polyurethane foam.

3. An article according to claim 1 wherein said gas is krypton or xenon.

4. An article according to claim 2 wherein the alkaline reagent is sodium hydroxide.

5. An article according to claim 5 wherein the relative humidity over the drying agent is less than about 15%.

6. An article according to claim 5 wherein the drying agent is calcium chloride dihydrate.

7. An article according to claim 2 wherein the blowing agent consists of carbon dioxide.

8. An article according to claim 2 wherein the molar ratios of getter to theoretical carbon dioxide and of drying agent to theoretical water formed are in the range of about 1.1–2.0:1.

9. An article according to claim 8 wherein the getter and drying agent are introduced at the time of foam production.

10. A refrigeration apparatus insulated by an article according to claim 1.

11. A refrigeration apparatus insulated by an article according to claim 2.

* * * * *

UNITED STATES PATENT AND TRADEMARK OFFICE
CERTIFICATE OF CORRECTION

PATENT NO. : 5,649,430

DATED : July 22, 1997

INVENTOR(S) : William J. Ward, III

It is certified that error appears in the above-identified patent and that said Letters Patent is hereby corrected as shown below:

Column 6, lines 27-28, should read --least one drying agent effective to produce, at a temperature in the range of 20-25°C and in the presence of water vapor, a relative humidity greater than the equilibrium relative humidity over a saturated aqueous solution of said getter at that temperature and less than about 20%, and a reaction product of said drying agent with water.--

Signed and Sealed this

Twenty-eighth Day of October, 1997

Attest:

BRUCE LEHMAN

Attesting Officer

Commissioner of Patents and Trademarks